United States Patent
Reilly et al.

(10) Patent No.: US 6,877,185 B2
(45) Date of Patent: Apr. 12, 2005

(54) CASTER DEVICE FOR MOVABLY SUPPORTING A LOAD

(75) Inventors: Earl J. Reilly, Prospect, CT (US); Robert F. Karas, Cheshire, CT (US); Stephen M. Devine, Washington Depot, CT (US)

(73) Assignee: Illinois Tool Works Inc., Glenview, IL (US)

( * ) Notice: Subject to any disclaimer, the term of this patent is extended or adjusted under 35 U.S.C. 154(b) by 215 days.

(21) Appl. No.: 10/242,983

(22) Filed: Sep. 13, 2002

(65) Prior Publication Data

US 2003/0051311 A1 Mar. 20, 2003

Related U.S. Application Data

(60) Provisional application No. 60/322,258, filed on Sep. 14, 2001.

(51) Int. Cl.[7] .......................... A47B 91/00; B60B 33/00
(52) U.S. Cl. .................................... 16/44; 16/21; 16/25
(58) Field of Search ............................... 16/44, 20, 21, 16/45; 248/188.8, 188.9; 280/86.1, 86.751, 87.01, 87.03

(56) References Cited

U.S. PATENT DOCUMENTS

| | | | |
|---|---|---|---|
| 18,467 A | 10/1857 | Norris | |
| 623,157 A | 4/1899 | Hunter | |
| 1,727,976 A | 9/1929 | Herold | |
| 1,739,716 A | 12/1929 | Fisher | |
| 1,755,537 A | 4/1930 | Deisler | |
| 1,880,703 A | 10/1932 | Bischoff et al. | |
| 1,884,142 A | * 10/1932 | Noelting ......................... | 16/21 |
| 2,042,525 A | * 6/1936 | Herold ........................... | 16/44 |
| 2,059,420 A | * 11/1936 | Ward, Jr. ....................... | 16/33 |
| 2,094,050 A | 9/1937 | Wachter | |
| 2,138,433 A | 11/1938 | Sunden | |
| 2,172,004 A | 9/1939 | Anderson | |
| 2,529,932 A | 11/1950 | Geisse | |
| 2,709,827 A | * 6/1955 | Volz .............................. | 16/33 |
| 2,914,340 A | * 11/1959 | Black .......................... | 280/86.1 |
| 2,942,698 A | 6/1960 | Bolinger | |
| 2,964,778 A | * 12/1960 | Frey .............................. | 16/21 |
| 3,337,230 A | * 8/1967 | Golding ................... | 280/87.03 |
| 4,515,235 A | * 5/1985 | Yamamoto et al. ......... | 180/168 |
| 4,707,880 A | * 11/1987 | Doyle et al. ................... | 16/38 |
| 5,214,823 A | 6/1993 | Screen ....................... | 16/35 D |
| 5,479,677 A | * 1/1996 | Chong ........................... | 16/21 |
| 6,195,838 B1 | * 3/2001 | Mains et al. ................... | 16/25 |
| 6,473,935 B1 | * 11/2002 | Cherukuri ...................... | 16/33 |

FOREIGN PATENT DOCUMENTS

DE 3232257 A1 * 3/1984
JP 10-82264 * 3/1998

* cited by examiner

Primary Examiner—Chuck Mah
(74) Attorney, Agent, or Firm—Mark W. Croll; Paul F. Donovan

(57) ABSTRACT

A caster device is disclosed for movably supporting a load. The caster device includes a wheel for supporting the load and a wheel support having a first and a second extremity. The first extremity of the wheel support supports the wheel for rotation of the wheel about an axis of rotation. The second extremity of the wheel support defines an aperture and the wheel support has a first surface and a second surface. A support stem has a first and a second end, the support stem extending through the aperture such that the aperture is disposed between the first and the second end of the support stem. The second end of the support stem is connected to the load for supporting the load. Also, a leaf spring is disposed between the aperture and the second end of the support stem such that the leaf spring resiliently contacts the load and cushions the load relative to the wheel.

23 Claims, 4 Drawing Sheets

CASTER DEVICE FOR MOVABLY SUPPORTING A LOAD

CROSS-REFERENCE TO RELATED APPLICATION

This application claims benefit to U.S. provisional application Ser. No. 60/322,258, filed on Sep. 14, 2001.

FIELD OF THE INVENTION

The present invention relates to a caster device for movably supporting a load. More particularly, the present invention relates to a caster device having a leaf spring for resiliently supporting a load.

BACKGROUND OF THE INVENTION

Casters are used in many applications for movably supporting loads. One such application is a creeper that is used by auto mechanics or auto owners when inspecting the underside of an automobile. The creeper includes a padded base and a headrest carried by a caster supported frame. The arrangement is such that the mechanic supported on the base is able to slide under the automobile for inspecting and working on the automobile.

However, the creeper is often moved to different locations and there is a tendency for the user to drop the creeper onto the concrete floor of the workstation rather than carefully placing the creeper on the floor at the correct location. Consequently, after prolonged usage of the creeper, the shock of dropping the creeper onto the hard floor causes the casters thereof and/or the frame supported by the casters to be damaged, thereby usually resulting in the ball bearings of the casters to drop out of the casters.

SUMMARY OF THE INVENTION

The present invention overcomes the aforementioned problems and other problems by the provision of a leaf spring which resiliently contacts the frame or load to be supported and cushions the casters so that any shock on the caster is primarily absorbed by the leaf spring. More particularly, the present invention includes a caster device having a wheel for supporting the load and a wheel support for supporting the wheel for rotation about an axis of rotation. A support stem extends through an aperture in the wheel support and between the load and the wheel. A leaf spring is disposed between the load and the wheel, such that the leaf spring resiliently contacts the load and cushions the load relative to the wheel when a force is applied to the caster device, thereby inhibiting any damage to the caster device on account of the force applied thereto. According to one aspect of the invention, the leaf spring is adapted to provide a degree of lateral support to the load. Furthermore, the leaf spring improves the comfort and ride. In the case of a garage creeper, the user of the creeper is able to move on the creeper more smoothly than was the case with prior art arrangements.

Therefore, another feature of the present invention is the provision of a caster device for movably supporting a load that reduces the chances of a caster and/or frame supported by the caster from being damaged after repeated use.

A further feature of the present invention is the provision of a caster device which provides a degree of lateral support to the load carried by the caster.

Yet another feature of the present invention is the provision of a caster device for movably supporting a load that provides smoother movement of the load supported by the caster.

Other features and advantages of the invention will become apparent to those skilled in the art upon review of the following detailed description, claims and drawings, in which like numerals are used to designate like features.

Figure 1:
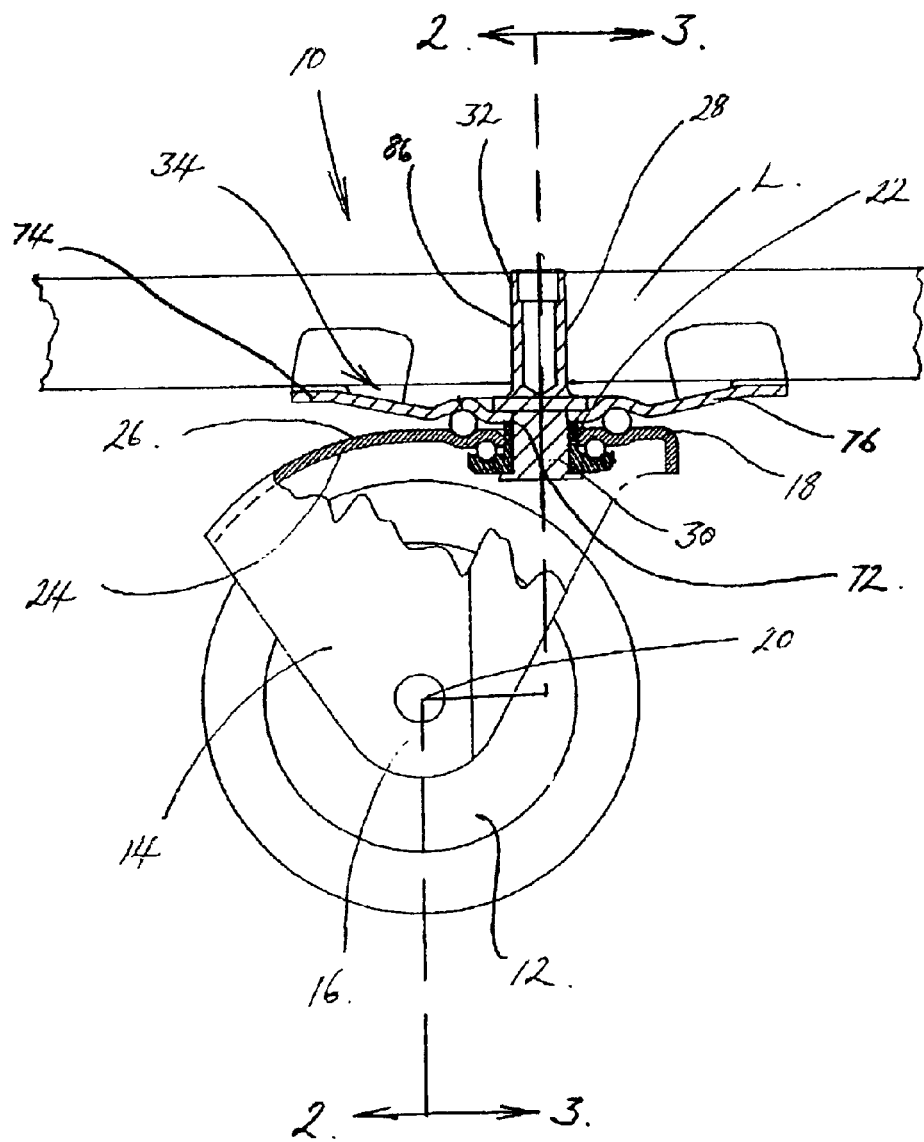
FIG. 1 is a side elevational view partially in section of a caster device according to the present invention for movably supporting a load.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENT

FIG. 1 is a side elevational view partially in section of a caster device generally designated 10 according to the present invention for movably supporting a load L. As shown in FIG. 1, the caster device 10 includes a wheel 12 for supporting the load L and a wheel support 14 having a first and a second extremity 16 and 18 respectively. The first extremity 16 of the wheel support 14 supports the wheel 12 for rotation of the wheel 12 about an axis of rotation 20. The second extremity 18 of the wheel support 14 defines an aperture 22 and the wheel support 14 has a first surface 24 and a second surface 26. A support stem 28 has a first and a second end 30 and 32 respectively, the support stem 28 extending through the aperture 22 such that the aperture 22 is disposed between the first and the second ends 30 and 32 respectively of the support stem 28. The second end 32 of the support stem 28 is connected to a load member L for supporting the load L. Also, spring member, preferably a leaf spring, generally designated 34 is disposed between the aperture 22 and the second end 32 of the support stem 28 such that the leaf spring 34 resiliently contacts the load L and cushions the load L relative to the wheel 12.

Figure 2:
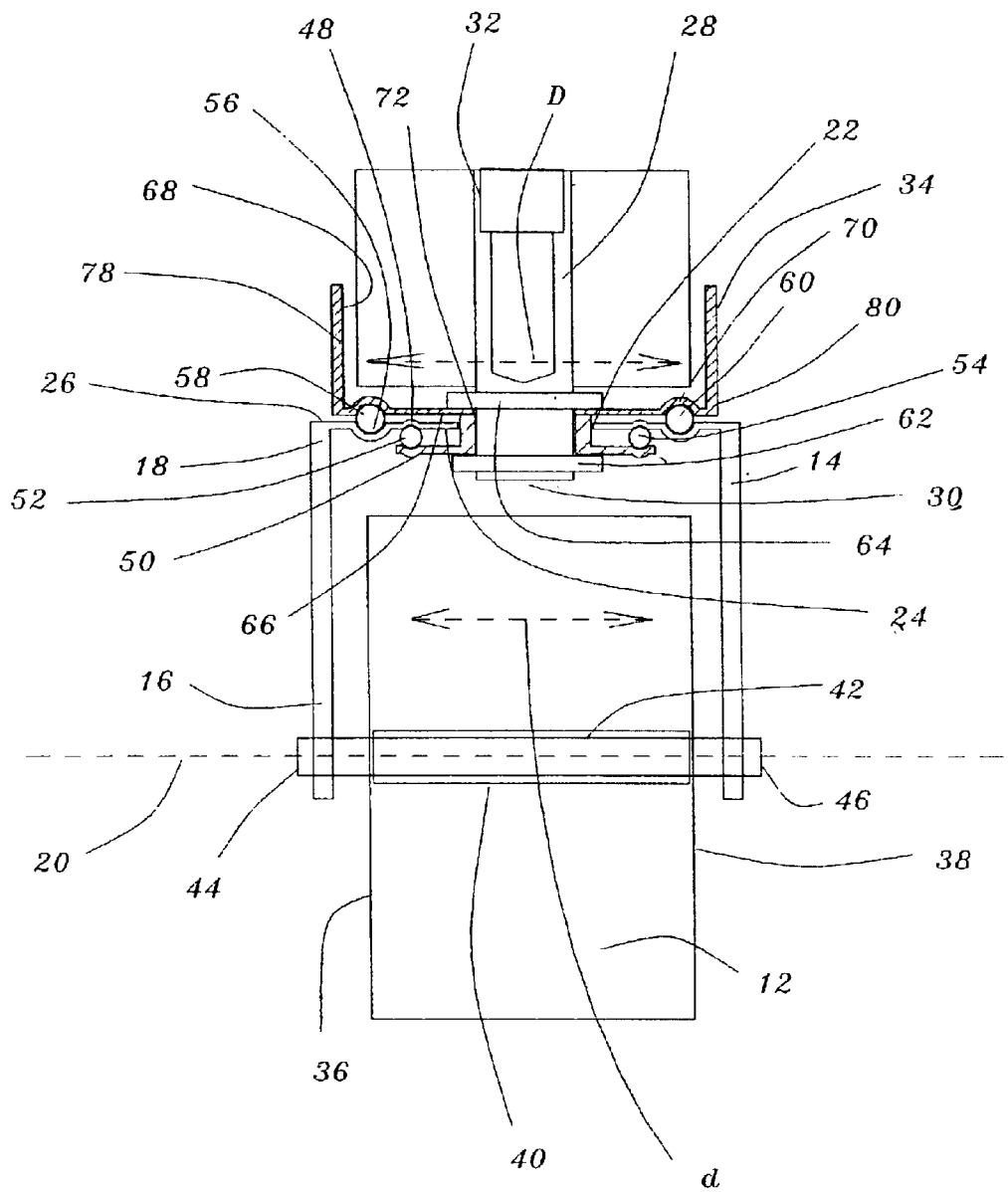
FIG. 2 is a sectional view taken on the line 2—2 of FIG. 1.

FIG. 2 is a sectional view taken on the line 2—2 of FIG. 1. As shown in FIG. 2, the wheel 12 is a caster having a first and a second side 36 and 38 respectively, the caster 12 defining a bore 40 which extends between the first and the second sides 36 and 38 respectively of the caster 12. An axle 42 has a first and a second termination 44 and 46 respectively, the axle 42 extending through the bore 40 such that the caster 12 is rotatably supported by the axle 42 for rotation thereof about the axis of rotation 20.

Furthermore, the wheel support 14 is a horn, the first extremity 16 of the wheel support 14 supporting the first and a second termination 44 and 46 respectively of the axle 42.

Additionally, the first surface 24 of the second extremity 18 of the wheel support 14 defines an annular depression 48, the depression 48 being disposed concentrically relative to the aperture 22. A bearing race 50 is secured to the first end 30 of the support stem 28, the bearing race 50 being disposed concentrically relative to the depression 48. A plurality of bearings 52 and 54 are disposed between the bearing race 50 and the depression 48 so that the bearings 52 and 54 are captured between the depression 48 and the bearing race 50, the depression 48 being disposed between the bearing race 50 and the second end 32 of the support stem 28. More specifically, the bearings 52 and 54 are ball bearings.

Moreover, the second surface 26 of the second extremity 18 of the wheel support 14 defines a further annular depression 56, the further annular depression 56 being disposed concentrically relative to the aperture 22. The further annular depression 56 has a greater diameter D than a diameter d of the annular depression 48.

The caster device 10 also includes a further plurality of bearings 58 and 60 that are captured between the further annular depression 56 and the leaf spring 34. The further plurality of bearings 58 and 60 are preferably further ball bearings.

Also, the support stem 28 includes a head 62 which is disposed adjacent to the first end 30 of the support stem 28 for preventing axial movement of the wheel support 14 relative to the support stem 28.

Additionally, the support stem 28 includes a radially extending flange 64 which is disposed between the first and the second ends 30 and 32 respectively of the support stem 28, the wheel support 14 and the leaf spring 34 being disposed between the head 62 and the flange 64 of the support stem 28.

The leaf spring 34 has a first and a second face 66 and 68 respectively, the first face 66 of the leaf spring 34 defining an annular recess 70 which cooperates with the further annular depression 56. The arrangement is such that the further plurality of bearings 58 and 60 are captured between the further annular depression 56 and the annular recess 70 of the leaf spring 34.

Moreover, the leaf spring 34 defines a hole 72 for the reception therethrough of the support stem 28 such that the leaf spring 34 is anchored to the support stem 28.

Furthermore, as shown in FIG. 1, the leaf spring 34 includes a first arm 74 which extends away from the hole 72 and a second arm 76 which extends away from the first arm 74 and the hole 72. The arms 74 and 76 respectively cooperate with and resiliently support the load.

More specifically, as shown in FIG. 2, the first arm 74 includes a first wing 78 and a second wing 80 which is disposed spaced and parallel relative to the first wing 78.

Figure 3:
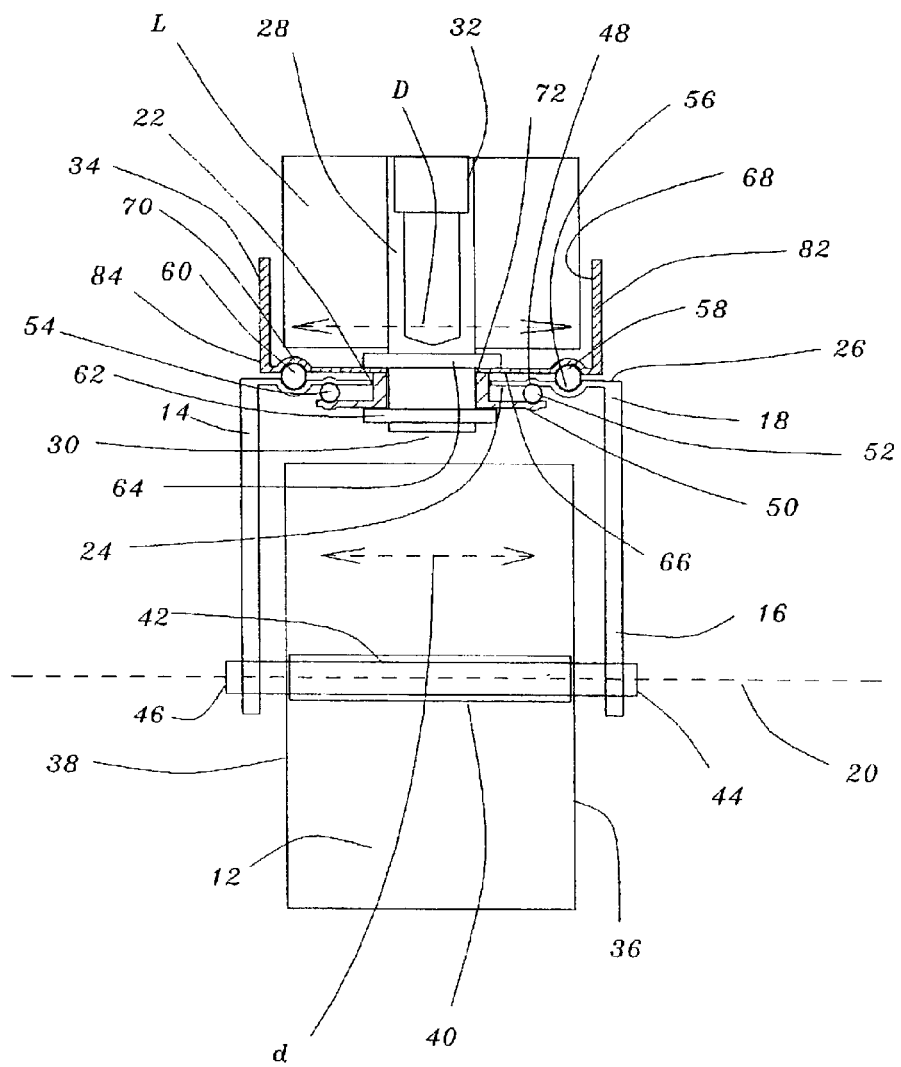
FIG. 3 is a sectional view taken on the line 3—3 of FIG. 1.

FIG. 3 is a sectional view taken on the line 3—3 of FIG. 1. As shown in FIG. 3, the second arm 76 (FIG. 1) includes a first wall 82 and a second wall 84 which is disposed spaced and parallel relative to the first wall 82. The wings 78 and 80 and the walls 82 and 84 cooperate with the load L in order to provide lateral support for the load L. The wings 78 and 80 and walls 82 and 84 are adapted to also stabilize the leaf spring 34 with respect to the load member L. Moreover, the wings 78 and 80 and walls 82 and 84 are configured such that when a force or load is applied to the caster device 10 to activate the leaf spring 34, the tabs or wings 78 and 80 and walls 82 and 84 do not completely disengage the load member L. Thus, It should be noted that although not shown in FIGS. 2 and 3, the tab members 78, 80, 82 and 84 are preferably engageable with the load member L.

Figure 4:
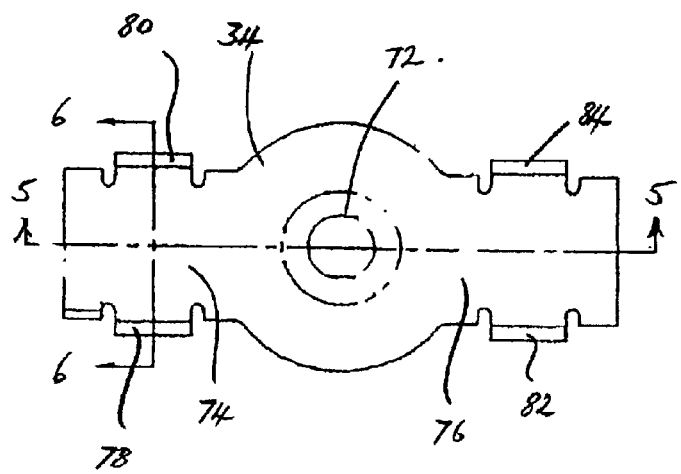
FIG. 4 is a top plan view of the leaf spring shown in FIGS. 1–3.

FIG. 4 is a top plan view of the leaf spring 34 shown in FIGS. 1–3. As shown in FIG. 4, the leaf spring 34 includes arms 74 and 76 and wings 78 and 80 and walls 82 and 84. Also, as shown in FIG. 4, the leaf spring 34 is preferably fabricated from a metallic spring sheet pressing. Although, the spring member 34 could be made of other suitable resilient materials.

Figure 5:
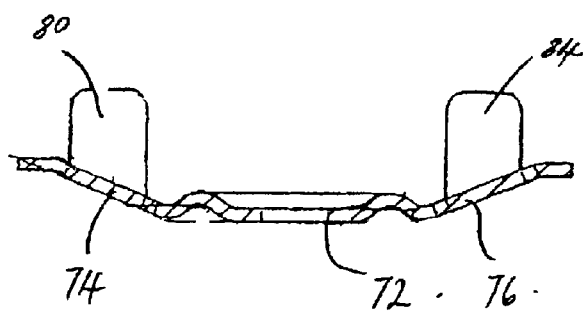
FIG. 5 is a sectional view taken on the line 5—5 of FIG. 4.

FIG. 5 is a sectional view taken on the line 5—5 of FIG. 4. As shown in FIG. 5, it can be appreciated that the wing 80 and the wall 84 provide a certain amount of lateral stability to the load L supported by the caster device 10.

Figure 6:
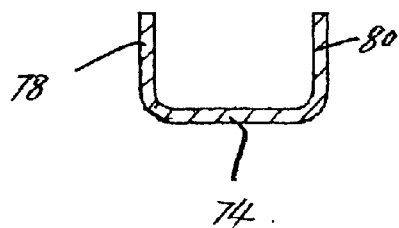
FIG. 6 is a sectional view taken on the line 6—6 of FIG. 4.

FIG. 6 is a sectional view taken on the line 6—6 of FIG. 4. As shown in FIG. 6, the wings 78 and 80 and arm 74 define a generally U-shaped configuration.

In operation of the caster device 10, the support stem 28 is inserted through the hole 72 of the leaf spring 34 and the ball bearings 58 and 60 are placed within the annular recess 70. The support stem 28 is inserted through aperture 22 of the wheel support 14 so that the further annular depression captures the bearings 58 and 60. The plurality of smaller bearings 52 and 54 are located within the annular depression 48 and the bearing race 50 is placed over the first end 30 of the support stem so that the bearings 52 and 54 are captured between the bearing race 50 and the annular depression 48. The first end 30 of the support stem 28 is then deformed or otherwise configured to provide the head 62 for locking the various components together. The second end 32 of the support stem is inserted within a complementary cavity 86 defined by the load L so that the load L is supported by the caster device 10 with the arms, wings and walls of the leaf spring 34 resiliently supporting the load L on the caster device. As can be observed in FIG. 1, a gap is provided between the leaf spring 34 and load member L, so as to desirably accommodate the movement of the spring 34 when subjected to a load.

The present invention provides a unique arrangement for resiliently supporting a load on a caster thereby prolonging the life of the caster.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A caster device for movably supporting a load, said caster device comprising:

a wheel for supporting the load;

a wheel support having a first and a second extremity, said first extremity of said wheel support supporting said wheel for rotation of said wheel about an axis of rotation, said second extremity of said wheel support defining an aperture, said wheel support having a first surface and a second surface;

a support stem having a first and a second end, said support stem extending through said aperture such that said aperture is disposed between said first and said second end of said support stem, said second end of said support stem being connected to the load for supporting the load;

a resilient member disposed between said aperture and said second end of said support stem such that said resilient member resiliently cushions the load relative to said wheel;

a bearing race secured to said support stem;

a plurality of bearings between said bearing race and said second extremity; and a further plurality of bearings disposed between said resilient member and said second extremity.

2. A caster device as set forth in claim 1, wherein said support stem includes a head disposed adjacent to said first end of said support stem for preventing axial movement of said wheel support relative to said support stem.

3. A caster device as set forth in claim 2, wherein said support stem includes a radially extending flange disposed between said first and said second ends of said support stem, said wheel support and said resilient member being disposed between said head and said flange of said support stem.

4. A caster device as set forth in claim 1, wherein said resilient member defines a hole for the reception therethrough of said support stem such that said resilient member is anchored to said support stem.

5. A caster device for movably supporting a load, said caster device comprising:

a wheel for supporting the load;

a wheel support having a first and a second extremity, said first extremity of said wheel support supporting said wheel for rotation of said wheel about an axis of rotation, said second extremity of said wheel support defining an aperture, said wheel support having a first surface and a second surface;

a support stem having a first and a second end, said support stem extending trough said aperture such that said aperture is disposed between said first and said second end of said support stem, said second end of said support stem being connected to the load for supporting the load; and a resilient member disposed between said aperture and said second end of said support stem such that said resilient member resiliently cushions the load relative to said wheel;

wherein an open gap is provided between said resilient member and the load.

6. A caster device as set forth in claim 5, wherein said resilient member is a leaf spring.

7. A caster device as set forth in claim 6, wherein said leaf spring is fabricated from a metallic spring sheet pressing.

8. A caster device as set forth in claim 5, wherein said wheel is a caster having a first and a second side, said caster defining a bore which extends between said first and said second side of said caster, said caster further including an axle having a first and a second termination, said axle extending through said bore such that said caster is rotatably supported by said axle for rotation thereof about said axis of rotation.

9. A caster device as set forth in claim 8, wherein said wheel support is a horn, and said first extremity of said wheel support supporting said first and a second termination of said axle.

10. A caster device as set forth in claim 5, wherein said first surface of said second extremity of said wheel support defines an annular depression, said depression being disposed concentrically relative to said aperture, said caster device further including a bearing race positioned relative to said first end of said support stem, said bearing race being disposed concentrically relative to said depression, and a plurality of bearings disposed between said bearing race and said depression so that said bearings are captured between said depression and said bearing race, said depression being disposed between said bearing race and said second extremity of said support stem.

11. A caster device as set forth in claim 10, wherein said bearings are ball bearings.

12. A caster device as set forth in claim 10, wherein said second surface of said second extremity of said wheel support defines a further annular depression, said further annular depression being disposed concentrically relative to said aperture.

13. A caster device as set forth in claim 12, wherein said further annular depression has a greater diameter than a diameter of said annular depression.

14. A caster device set forth in claim 13, further including a further plurality of bearings captured between said further annular depression and said resilient member.

15. A caster device as set forth in claim 14, wherein said further plurality of bearings are further ball bearings.

16. A caster device as set forth in claim 14, wherein said resilient member has a first and a second face, said first face of said resilient member defining an annular recess which cooperates with said further annular depression such that said further plurality of bearing are captured between said further annular depression and said annular recess of said resilient member.

17. A caster device for movably supporting a load, said caster device comprising:

a wheel for supporting the load;

a wheel support having a first and a second extremity, said first extremity of said wheel support supporting said wheel for rotation of said wheel about an axis of rotation, said second extremity of said wheel support defining an aperture, said wheel support having a first surface and a second surface;

a support stem having a first and a second end, said support stem extending through said aperture such that said aperture is disposed between said first and said second end of said support stem, said second end of said support stem being connected to the load for supporting the load;

a resilient member disposed between said aperture and said second end of said support stem such that said resilient member resiliently cushions the load relative to said wheel; and wherein said resilient member defines a hole for the reception therethrough of said support stem such that said resilient member is anchored to said support stem, and said resilient member includes a first arm which extends away from said hole, and a second arm which extends away from said first arm and said hole, said arms cooperating with and resiliently supporting the load.

18. A caster device as set forth in claim 17, wherein said first arm includes a first wing, and a second wing disposed spaced and parallel relative to said first wing, and wherein said second arm includes a first wall, and a second wall disposed spaced and parallel relative to said first wall, said wings and said wails cooperating with the load to provide lateral support for the load.

19. An assembly for movably supporting a load, said assembly comprising:
- a frame;
- a wheel;
- a wheel support for supporting said wheel for rotation about an axis;
- a support stem extending between and connected to said wheel support and said frame; and
- a spring member disposed about said support stem and between said wheel support and said frame so as to define a gap between said spring member and said frame, such that when a force is applied to said assembly, said spring member is adapted to resiliently move within said gap so as to prevent the other members of said assembly from being damaged on account of the force applied thereto.

20. An assembly as set forth in claim 19, wherein said spring member includes a first arm having a pair of spaced apart tab members, and a second, oppositely extending arm having a second pair of spaced apart tab members, said tab members configured to engage opposite sides of said frame.

21. An assembly as set forth in claim 20, wherein said tabs members are configured to remain in engagement with the associated sides of said frame when said assembly is subjected to outside forces.

22. An assembly as set forth in claim 19, further comprising a plurality of bearings captured between said wheel support and said spring member to allow said wheel support to rotate with respect to support stem.

23. A caster device for movably supporting a load, said caster device comprising:
- a wheel for supporting the load, said wheel being a caster having a first and a second side, said caster defining a bore which extends between said first and said second sides of said caster;
- an axle having a first and a second termination, said axle extending through said bore such that said caster is rotatably supported by said axle for rotation thereof about said axis of rotation;
- a wheel support having a first and a second extremity, said first extremity of said wheel support supporting said wheel for rotation of said wheel about an axis of rotation, said second extremity of said wheel support defining an aperture, said wheel support having a first surface and a second surface, said wheel support being a horn, said first extremity of said wheel support supporting said first and second termination of said axle, a first surface of said second extremity of said wheel support defining an annular depression, said depression being disposed concentrically relative to said aperture, a second surface of said second extremity of said wheel support defining a further annular depression, said further annular depression being disposed concentrically relative to said aperture, said further annular depression having a greater diameter than a diameter of said annular depression;
- a support stem having a first and a second end, said support stem extending through said aperture such that said aperture is disposed between said first and said second end of said support stem, said second end of said support stem being connected to the load for supporting the load, said support stem including a head disposed adjacent to said first end of said support stem for preventing axial movement of said wheel support relative to said support stem, and said support stem further including a radially extending flange disposed between said first and said second ends of said support stem;
- a bearing race secured to said first end of said support stem, said bearing race being disposed concentrically relative to said annular depression;
- a plurality of ball bearings disposed between said bearing race and said depression so that said bearings are captured between said annular depression and said bearing race;
- a leaf spring fabricated from a metallic spring sheet pressing, said leaf spring being disposed between said aperture and said second end of said support stem, and said leaf spring and a portion of said wheel support being disposed between said head and said flange of said support stem, such that said leaf spring resiliently contacts the load and cushions me load relative to said wheel, said leaf spring having a first and a second face, said leaf spring defining a hole for the reception therethrough of said support stem such that said leaf spring is anchored to said support stem, said leaf spring including a first arm which extends away from said hole, a second arm which extends away from said first arm and said hole, said arms cooperating with and resiliently supporting the load, said first arm including, a first wing and a second wing disposed spaced and parallel relative to said first wing, said second arm including a first wall and a second wall disposed spaced and parallel relative to said first wall, said wings and said walls cooperating with the load to provide lateral support for the load and to prevent said leaf spring from rotating with respect to the load; and
- a further plurality of ball bearings;
- wherein said first face of said leaf spring defines an annular recess which cooperates with said further annular depression such that said further plurality of bearings are captured between said further annular depression and said annular recess of said leaf spring.

* * * * *